Patented Jan. 26, 1932

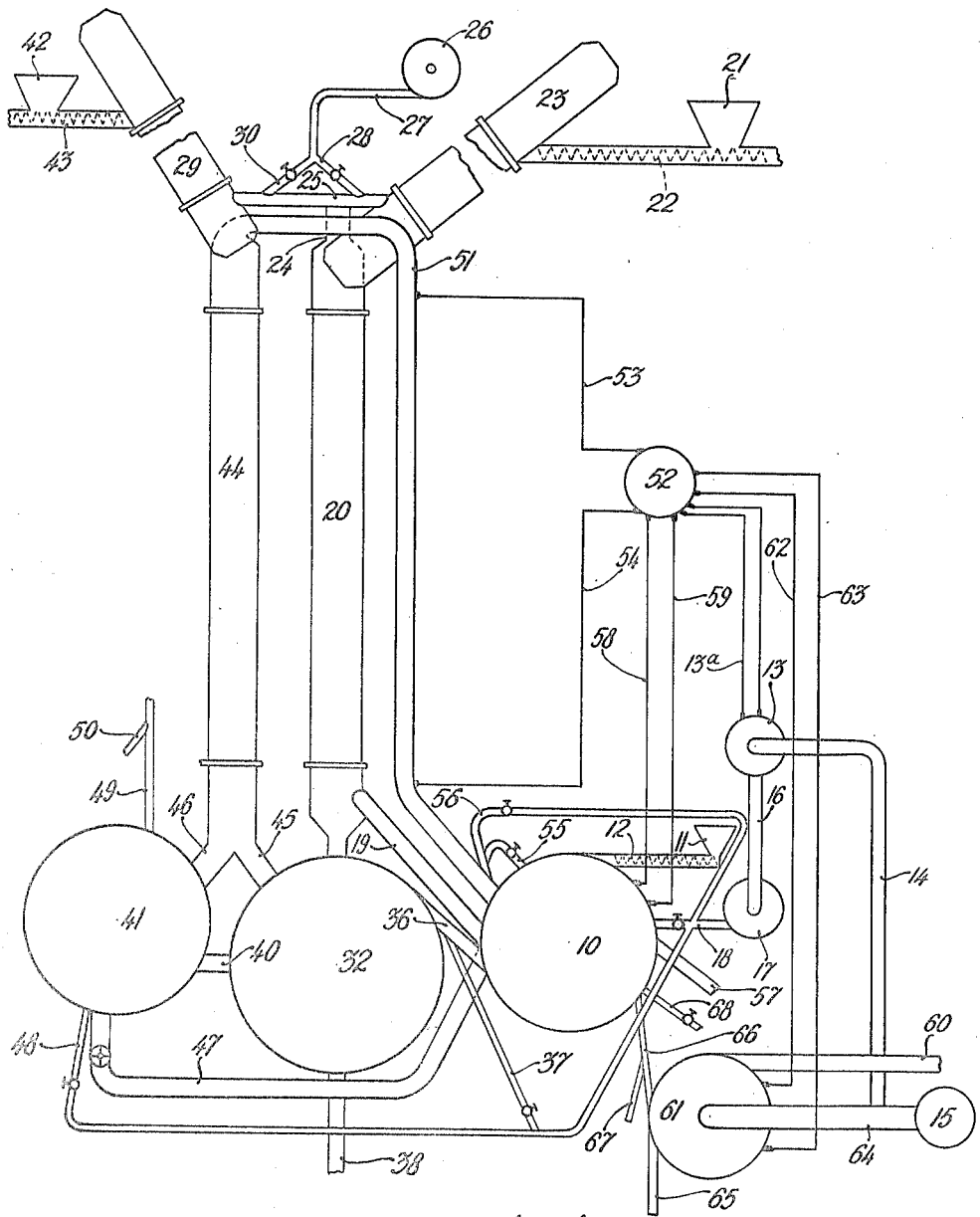

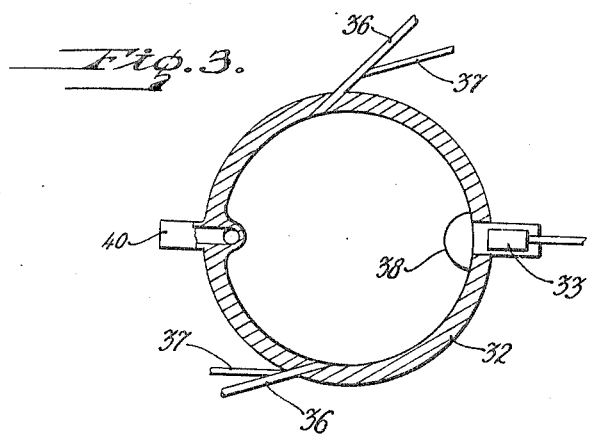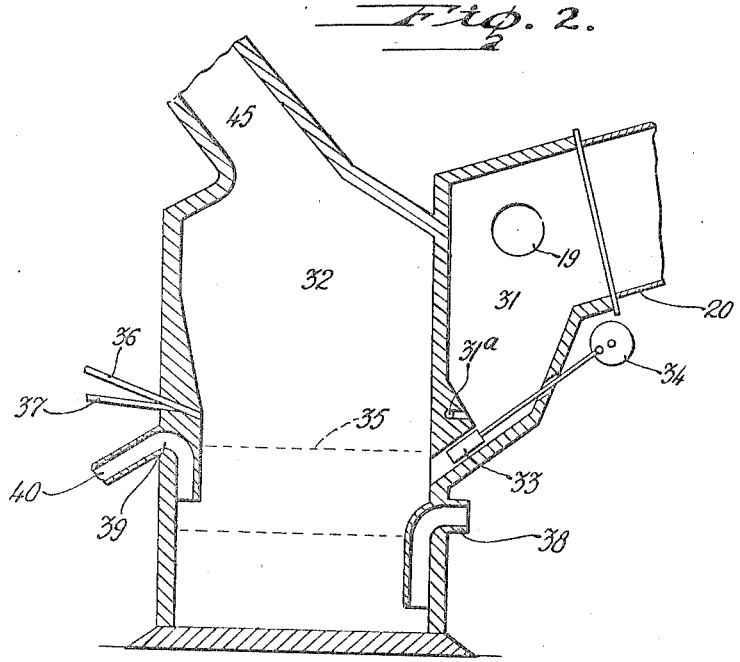

1,842,609

UNITED STATES PATENT OFFICE

CHARLES B. HILLHOUSE, OF NEW YORK, N. Y.

METHOD OF UTILIZING FREE OXYGEN IN THE PRODUCTION OF CEMENT AND IRON

Application filed March 12, 1929, Serial No. 346,364, and in Italy April 14, 1928.

This invention relates to a method of utilizing free oxygen in the production of cement and iron and in the saving of carbon dioxide dissociated from limestone.

The cement and iron part of this process is intended to be an improvement on Patents Nos. 1,366,383 and 1,555,283 issued to me on January 25, 1921 and September 29, 1925, respectively, and also on patent for a muffled gas regenerator No. 1,163,922 issued to me on December 14, 1915.

A very high temperature must be had in the cement fusion furnace to maintain higher lime silicates in a state of fusion. This can readily be obtained by using free oxygen as combustion medium, while with air it is a difficult operation.

Also using an independent combustion heating agent with an unmuffled flame in the gas regenerator instead of a muffled furnace is believed to be a distinct improvement and for which applications for patents are now pending.

Here, too, oxygen may be used to burn carbon to incomplete combustion, so as to supply heat for regeneration of gases brought into the gas regenerator, when it is desirable to do so.

In both above patents for cement and iron air was used for combustion in both furnaces, the gas regenerators were of the muffled type. In my Patent No. 1,163,922, the gas generator was also of the muffled type.

The other new subjects enter the process as a part of the whole cycle.

Essentially the method consists in first obtaining carbon monoxide gas, then burning it in free oxygen in a cement furnace or in cement and iron furnaces, closed to the atmosphere, and then regenerating the gases of combustion in a continuous cycle.

The oxygen for use with this method may be provided from any source, as for instance, from electrolysis of water, and the hydrogen dissociated from the water may be used for hydrogenation purposes such as hydrogenation of petroleum and the fixation of nitrogen in the production of synthetic ammonia.

The hot gas of combustion ($CO_2$) produced by the burning of the carbon monoxide with the free oxygen is quite pure owing to the exclusion of the atmosphere from the combustion chamber; and this hot carbon dioxide is passed through a lime kiln and picks up in transit the carbon dioxide there dissociated from limestone or carbonate of lime and the whole bulk of gas thus obtained is returned for regeneration.

All of these objects are attained by means shown in the accompanying drawings which are all more or less diagrammatic in nature and in which:

Fig. 1 is a plan view of complete apparatus for carrying my invention into effect.

Fig. 2 is a vertical sectional view of the metal fusion furnace used in carrying my process into effect.

Fig. 3 is a horizontal section of the same.

Like characters of reference refer to like parts in all views.

Before taking up in detail the means for carrying the process into effect, it may be well to first consider the nature of the process, and the manner in which it is contemplated to affect the several materials involved.

In its simplest form, the invention contemplates the use of free oxygen for combustion or gasification in the manufacture of cement and iron, the gangue of the iron ore furnishing a suitable proportion of silica for the cement, while a part of the lime made is used to slag iron ore the balance of the lime made is added to this slag to make cement clinker and gases of combustion or reduction regenerated in a continuous cycle. Pressing the process a step farther the oxygen for the combustion or gasification may be furnished from water dissociated by electrolysis, and the hydrogen thus obtained may be used for the fixation of nitrogen in the manufacture of synthetic ammonia or other hydrogenation purposes. Proceeding a step farther a portion or all of the carbon dioxide dissociated from the limestone may be saved and regenerated.

Referring now to the drawings in detail, 10 represents a gas generator to which dissociated carbon, coal or any carbonaceous material is fed from a hopper 11 by means of a closed conveyor 12 or led into the gas generator by any other means. A device for effecting dissociation of water by electrolysis is shown at 13, the hydrogen being conducted by a pipe 14 to a hydrogenation apparatus indicated at 15, and the oxygen being conducted by a pipe 16 to a blower 17 and thence through a pipe 18 to the several places where needed. Electrical connections from a source of supply 52 to the device 13 are indicated at 13a. Valves are provided in the several oxygen supply pipes to regulate the amount of this gas delivered.

Oxygen is delivered from the pipe 18 to the generator 10 and is there burned with excess carbon either from the conveyor 12 or from another source which will be presently described. Combustion will be incomplete forming carbon monoxide, or if any complete combustion does occur, the heat is maintained high enough to cause regeneration of the carbon dioxide in contact with incandescent carbon.

Part of the hot carbon monoxide formed in the generator 10 is passed by a conduit 19 to an ore reducing furnace 20 or carbon monoxide or other reducing agent may be otherwise supplied. Iron ore is fed from a hopper 21 by a conveyor 22 to an ore preheater 23 where the ore is preheated by means to be presently set forth; and is then passed into the reducing furnace 20 where it is reduced to a sponge. The carbon dioxide and part of the carbon monoxide from this furnace is passed through a pipe 24 to a lateral pipe 25 which conducts part of these gases to the preheater 23. Air from a blower 26 passes through a pipe 27 and a branch 28 combining with any carbon monoxide passing off into the heater 23 to cause heating of the ore therein. The balance of the hot gases passed to pipe 25 is conducted to a limestone preheater 29, air being fed from pipe 27 through another branch 30, where it is combusted as in 23 and gases from both preheaters are discarded.

The sponge iron from furnace or rotary kiln 20 passes into a sump 31, Fig. 2 and is injected into the fusion furnace 32 by means of a pusher 33 operable from a rotating eccentric 34. An inlet is shown at 31a for permitting injection of carbon or other material. The slag level is indicated in Fig. 2 by the dotted line 35, and it will be noted that the sponge is injected into the furnace 32 below this slag level so that the sponge is "wet" before it contacts with air or the gases in the furnace. Carbon monoxide is conducted from generator 10 to the furnace 32 by one or more tangential pipes 36 and oxygen may be fed to this gas at its point of entry into the furnace 32 by pipes 37 which receive their supply from pipe 18. Though drawings show that oxygen is used in the iron fusion furnace, air may be used instead, as a very high temperature is not required in the iron fusion furnace, in which case the gases of combustion would be utilized, elsewhere in the process than passing them thru lime kiln 44. I prefer as an essential feature of my novel combination as hereinbefore set forth, to feed pure oxygen to my iron fusion furnace, thereby avoiding the presence of nitrogen whereby a maximum of pure carbon dioxide is maintained in the gas regeneration cycle. The tangential entry of these gases into the furnace causes a slow whirling of the mixture about the furnace and keeps heat applied at the edge of the rotating mass. The molten metal may be taken off at 38 and the slag is taken off at 39 and conducted by a pipe 40 to a cement fusion furnace 41.

The slag taken over into the cement furnace 41 furnishes the silica and a portion of the lime for the production of cement. An easy fusing slag in iron fusion furnace low in lime and a high lime slag of cement proportions in cement fusion furnace which requires a very high combustion temperature is obtained by burning carbon monoxide with free oxygen. Referring again to Fig. 1 limestone is fed from a hopper 42 by a conveyor 43 to the preheater 29, and from thence into a lime kiln 44 where the carbon dioxide is dissociated from the lime part of the latter being passed through a flue 45 into the iron fusion furnace 32 and the remainder through a flue 46 into the cement fusion furnace 41. Also carbon dioxide from furnaces 32 and 41 is passed through flues 45 and 46 to the kiln 44 where it effects dissociation of the limestone by its sensible heat. Carbon monoxide is fed from generator 10 to the cement fusion furnace 41 by a pipe 47 and oxygen is supplied from pipe 18 by a pipe 48. The cementitious slag or clinker is carried off from furnace by a conduit 49, a shotting device being indicated at 50 and is ready to be ground into cement.

The carbon dioxide passed to the lime kiln 44 by flues 45 and 46 together with the carbon dioxide liberated in the kiln is passed off from the kiln and conducted by a pipe 51 back to the generator 10 for regeneration into carbon monoxide. This carbon dioxide during its travel through the pipe 51 is reheated. This heating may be accomplished by any suitable means other than electric energy. After the returning gas has been thus preheated, it may be subjected to a further heating just before entering the generator, by conducting carbon monoxide from the generator 10 through a pipe 55 and burning it with oxygen supplied by a pipe 56 from the supply line 18, shooting the flame thus produced directly into the returning carbon dioxide just prior to its entry into the generator 10.

The returned carbon dioxide is regenerated in generator 10 and part of the resulting carbon monoxide starts the cycle over while the surplus may be taken off through one or more pipes 57. The generator 10 may be heated in any suitable manner, as for instance by combustion in the same chamber as the gas making materials. Steam may also be entered into the generator 10 in desired quantity by a pipe 68.

It will now be understood that by excluding the atmosphere from the members 10, 32 and 41, the carbon monoxide and carbon dioxide are kept relatively pure and the system can be operated with the greatest facility and convenience. Furthermore, it is to be noted that substantially all of the waste products resulting from one operation are utilized in another operation or in making by-products. Thus the excess carbon monoxide from the reduction kiln is utilized in the preheaters; the hydrogen from the water dissociator is utilized for hydrogenation purposes; sensible heat in the carbon dioxide from the cement fusion furnaces is utilized for the dissociation of limestone; the slag from the iron fusion furnace is utilized to furnish the silica for making cement while lime is obtained from dissociated limestone; the pure carbon dioxide from the cement fusion furnace and the lime kiln is returned to the generator and regenerated into carbon monoxide, and oxygen may be furnished by dissociation of water. Thus a complete cycle is obtained, the only waste products are the gases passed off through the preheaters and some discarded coal ash.

While I have described what I consider to be the most desirable manner of carrying my invention into effect, it is obvious that many of the details could be varied without departing from the spirit of my invention, and I, therefore, do not limit myself to the exact details set forth nor to anything less than the whole of my invention as herein described and as hereinafter claimed.

I claim:

1. The method of utilizing free oxygen in the production of cement and iron and in the saving of carbon dioxide dissociated from limestone which consists in causing oxygen to combust with carbon monoxide in an iron fusion furnace to increase the furnace temperature and then passing the hot gases of combustion therefrom thru a lime kiln to dissociate limestone, withdrawing from the kiln an increased quantity of carbon dioxide and passing same, without having any nitrogen or inert gases accompanying it, thru a gas regenerator containing carbonaceous material which is maintained incandescent by combustion in the same chamber.

2. The process of making cement clinker with an iron or steel by-product which comprises passing iron ore through a reducing retort, supplying carbon monoxide to said retort from a generator, feeding the reduced ore to an iron fusion furnace, supplying carbon monoxide to said fusion furnace from said generator, supplying oxygen to said fusion furnace, said carbon monoxide and oxygen being admitted tangentially into said furnace to provide a whirling of the gases during combustion thereof to carbon dioxide, passing a portion of the carbon dioxide formed through a limestone retort to effect formation of lime in said retort, passing a portion of carbon dioxide from said limestone retort to said carbon monoxide generator whereby to save carbon dioxide formed in said furnace and limestone retort and feeding the lime formed into said furnace.

3. The process of making cement clinker with an iron or steel by-product which comprises supplying carbonaceous material and oxygen to a gas regenerator and maintaining said regenerator incandescent by combustion therein, whereby to form carbon monoxide, passing iron ore through a reducing retort and feeding the reduced iron ore to an iron fusion furnace, supplying carbon monoxide to said furnace from said regenerator, supplying oxygen to said furnace, passing a portion of the carbon dioxide formed through a limestone retort to effect formation of lime in said retort, passing a portion of carbon dioxide from said limestone retort to said carbon monoxide regenerator whereby to save carbon dioxide formed in said furnace and said limestone retort, and feeding the lime formed into said furnace.

4. The process of making cement clinker with an iron or steel by-product which comprises passing iron ore through a reducing retort, supplying carbon monoxide to said retort from a generator, feeding the reduced ore to an iron fusion furnace, supplying carbon monoxide to said fusion furnace from said generator, supplying oxygen to said fusion furnace, passing a portion of the carbon dioxide formed through a limestone retort to effect formation of lime in said retort, passing a portion of carbon dioxide from said limestone retort to said carbon monoxide generator whereby to save carbon dioxide formed in said furnace and said limestone retort and feeding the lime formed into said furnace.

5. The method of utilizing free oxygen in the production of cement and iron and in the saving of carbon dioxide dissociated from limestone which consists in causing oxygen to combust with carbon monoxide in an iron fusion furnace so as to increase the furnace temperature, passing the hot gases of combustion therefrom through a lime kiln to dissociate limestone, withdrawing the increased quantity of carbon dioxide from the kiln and passing same, without having any nitrogen or inert gases accompanying it, through a gas regenerator containing carbonaceous material which is maintained incandescent by combustion in the same chamber, whereby to produce carbon monoxide, passing iron ore through a reducing retort and feeding the reduced iron ore to said iron furnace, passing slag from said iron fusion furnace to a cement fusion furnace, and supplying carbon monoxide from said gas regenerator to said cement fusion furnace.

In testimony whereof I affix my signature.

CHARLES B. HILLHOUSE.